Feb. 11, 1969     G. H. BROWN     3,427,507
CONTROL FOR ELECTRIC MOTOR WITH SAFETY SWITCH
Filed Sept. 9, 1966
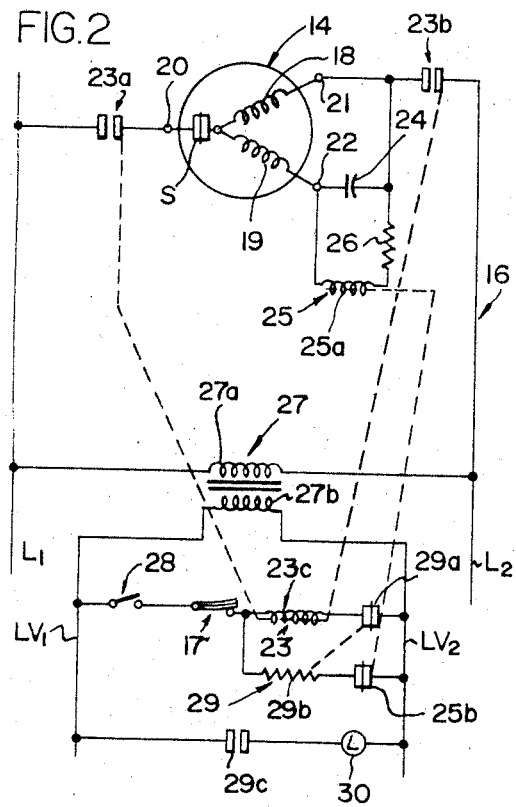
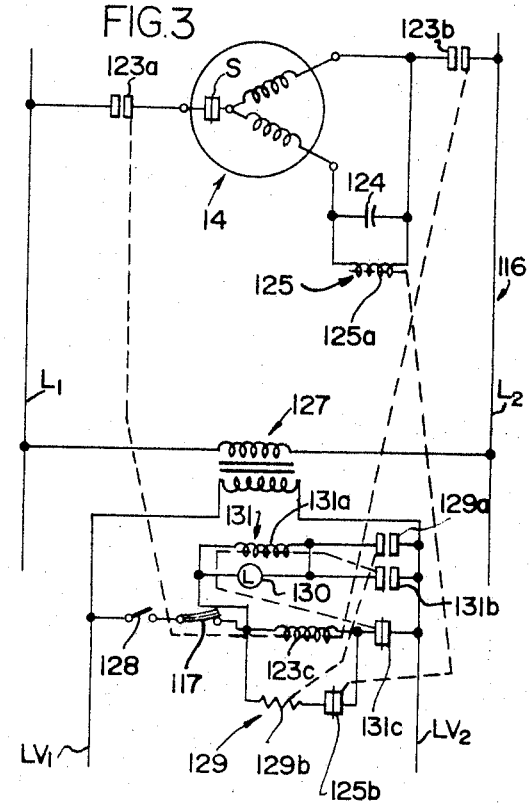
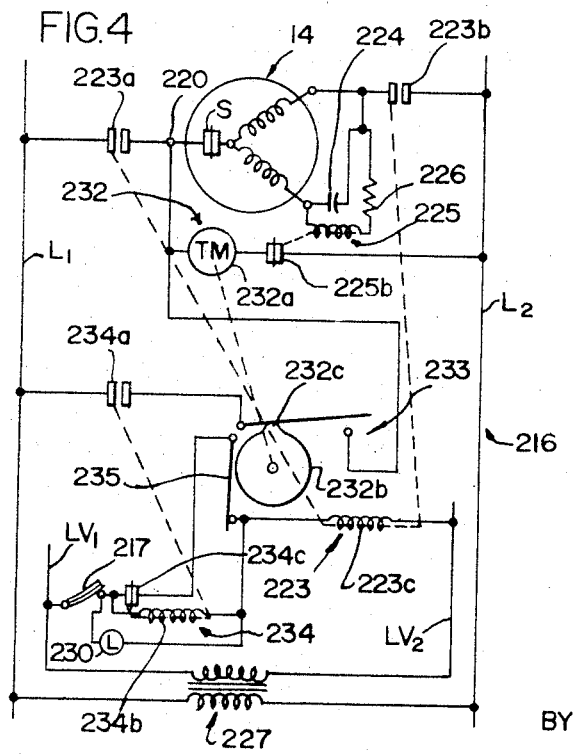
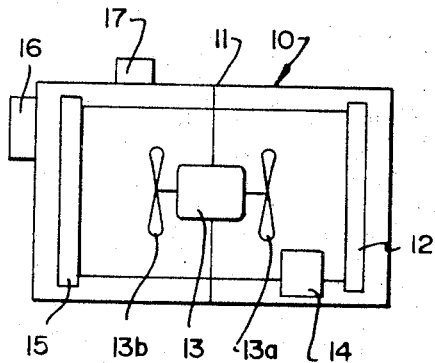
INVENTOR
GORDON H. BROWN
BY Hofgren, Wegner, Allen,
Stellman & McCord
ATTORNEYS.

United States Patent Office 3,427,507
Patented Feb. 11, 1969

3,427,507
CONTROL FOR ELECTRIC MOTOR
WITH SAFETY SWITCH
Gordon H. Brown, St. Joseph, Mich., assignor to Whirlpool Corporation, a corporation of Delaware
Filed Sept. 9, 1966, Ser. No. 578,235
U.S. Cl. 317—41
Int. Cl. H02h 5/04
12 Claims

ABSTRACT OF THE DISCLOSURE

A control for use with a motor having an internal safety switch. The control includes means for storing energy, such as heat energy, when the safety switch opens while yet the motor remains connected across the power supply as by a maintained closure of the motor disconnect switch. The control eliminates unnecessary time delay in restarting the motor where malfunction conditions are insufficient to have injurious effect on the motor while assuring discontinuance of the operation of the motor where serious abnormal conditions obtain. The control further is arranged to dissipate the accumulated energy to correlate the operation with the time the safety switch is closed as well as with the time the safety switch is open.

This invention relates to control circuits and in particular to motor control circuits for use with motors such as hermetically sealed compressor motors utilized in refrigeration apparatus.

The control operation sought to be effected is a disabling of the compressor motor power circuit in the event of compressor malfunction. The control circuit for apparatus of this type is conventionally a low voltage circuit wherein a thermostat device controls the energization of a contactor coil which in turn controls the operation of contactor switches in the power circuit for the compressor. Prior art circuits have utilized protective switches in the control circuit and in series with the contactor coil, such that upon opening of a protective switch the contactor coil is de-energized to thereby effect interruption of the power circuit. In recent hermetically sealed compressor constructions the motors for such compressors have been provided with internal protective switches operated by high temperature and/or high current, the switches being of the line break type and located in the power circuit. In such compressor constructions, the protective switch is no longer in the low voltage circuit in series with the contactor coil and opening of the protective switch does not de-energize the contactor coil. It is, therefore, necessary to provide other means for de-energizing the contactor coil upon malfunction of the compressor.

In addition, it is desirable to provide means for preventing the re-energization of the coil in the event of a prolonged compressor failure or series of failures within a relatively short period of time. For example, in the event that the voltage of the motor power supply is low, the resultant increased starting current may cause the protective or safety switch to open and disconnect the motor from the line. However, when the current flow stops, the safety switch again closes after a cool down period, and the motor restarts. Such cycling may cause substantial damage to the motor by over-heating the motor. To avoid an undesirable rapid cycling condition, controls have been provided in the art for holding the circuit open for a preselected period of time after the safety switch disconnects the motor from the line.

The present invention comprehends an improved control wherein means are provided for opening the circuit to the motor as a function of the total time during which the safety switch is open, thus providing an improved control of the motor in eliminating unnecessary time delay in restarting the apparatus where the malfunction conditions that obtain are insufficient to have any injurious effect on the motor, while yet assuring a discontinuation of the operation of the motor where sufficiently serious abnormal starting or running conditions obtain such as may damage the motor.

Thus, a principal feature of the present invention is the provision of a new and improved motor control.

Another feature of the invention is the provision of such a motor control having new and improved means for co-operation with an internal safety switch of the motor for controlling the shut down thereof.

A further feature of the invention is the provision of such a motor control wherein the cooperating control means are arranged to provide a time delay before functioning to disconnect the motor from the power supply to permit limited cyclical operation of the safety switch thereof but preventing continued operation which would damage the motor.

Still another feature of the invention is the provision of such a motor control wherein the time delay means includes means for accumulating an operating medium such as thermal energy or time and, upon accumulation of a preselected quantity thereof, effecting a disconnection of the electric motor.

A yet further feature of the invention is the provision of such a motor control further including means for dissipating the accumulated operating medium whereby the control operates both as a function of the amount of time the safety switch is open and of the amount of time the safety switch is closed between successive openings of the safety switch.

Another feature of the invention is the provision of such a drive motor control wherein the accumulating means comprises a timer motor and means for moving the timer motor in accordance with the length of time the safety switch is open during each drive motor disconnecting cycle and means responsive to a preselected total movement of the timer motor to effect a disconnection of the drive motor from the power supply.

Other features and advantages of the invention will be apparent from the following description taken in connection with the accompanying drawing wherein:

FIGURE 1 is a front elevation of a refrigeration apparatus having a compressor motor and means for controlling the motor embodying the invention;

FIGURE 2 is a schematic wiring diagram illustrating a control circuit embodying the invention in a preferred form;

FIGURE 3 is a schematic wiring diagram illustrating a modified control circuit embodying the invention; and FIGURE 4 is a schematic wiring diagram illustrating a further modified control circuit embodying the invention.

In the illustrative embodiment of the invention as disclosed in FIGURE 1 of the drawing, a refrigeration apparatus, herein a room air conditioner, generally designated 10 is shown to include a cabinet 11 housing a condenser 12, a fan motor 13 for driving a condenser fan 13a and an evaporator fan 13b, a motor compressor 14 and conventional heat transfer means such as evaporator means 15 for providing refrigerated air to an enclosure to be cooled. The invention may be used with other refrigeration apparatus and is well adapted for use with central air conditioning apparatus. The invention comprehends the provision of an improved control 16 for use in connection with a thermostat switch 17 for controlling the motor 14 where the motor 14 comprises a conventional motor construction having an internal normally closed safety switch S, a run winding 18, and a start winding 19 Y-connected to three external terminals 20, 21 and 22, respectively.

As indicated briefly above, malfunctioning of such refrigeration apparatus motor compressors may occur as the result of low voltage conditions in the power supply, or as the result of overloads due to malfunctioning of the refrigeration apparatus, etc. The safety switch S is of conventional construction responsive to high temperature conditions in the compressor to open and break the common connection to the run and start windings of the motor 14. Control 16, as shown in FIGURE 2, is electrically associated with the motor 14 to provide an improved control of the operation of the motor in conjunction with the operation of the safety switch S. More specifically, terminal 20 of the motor 14 is connected to one power supply lead $L_1$ through a first switch 23a of a contactor 23 and terminal 21 is connected to the other power supply lead $L_2$ through a second contactor switch 23b. Terminal 22 is connected to terminal 18 through a capacitor 24 in parallel with a relay coil 25a and a series resistor 26.

A step down transformer 27 has its primary winding 27a connected between power supply leads $L_1$ and $L_2$, and its secondary winding 27b connected to low voltage power supply leads $LV_1$ and $LV_2$, respectively. A contactor coil 23c for closing switches 23a and 23b is connected to power supply lead $LV_1$ through a series connection of an on-off manually operable switch 28 and thermostat switch 17. The contactor coil 23c is connected to power supply lead $LV_2$ through a normally closed thermally responsive switch 29a of a thermal relay 29 which is selectively opened by a suitable source of energy, herein a heater, 29b connected between thermostat switch 17 and power supply lead $LV_2$ in series with a normally closed switch 25b of a relay 25. As shown, switch 25b is controlled by relay coil 25a. A signal light 30 may be connected in series with a normally open switch 29c also controlled by heater 29b and connected between power supply leads $LV_1$ and $LV_2$ for indicating operation of the control 16.

More specifically, control 16 operates as follows. Assuming that the apparatus is arranged for operation with the switch 28 closed, when the temperature of the enclosure to be cooled rises to a preselected high value, the thermostat switch 17 closes, thereby connecting contactor coil 23c through the normally closed switch 29a between the power supply leads $LV_1$ and $LV_2$, and thereby causing switches 23a and 23b to close and connecting motor 14 between the power supply leads $L_1$ and $L_2$. Energization of motor 14 causes a voltage drop across capacitor 24 and relay coil 25a, thereby energizing the coil 25a and causing the normally closed switch 25b to open, thereby disconnecting heater 29b from power supply lead $LV_2$. Thus, under these normal operating conditions, no further operation of control circuit 16 occurs until thermostat switch 17 reopens when the temperature of the enclosure to be cooled reaches the preselected low level.

However, in the event that the safety switch S opens as a result of a high current flow therethrough or high temperature condition in the motor 14, relay coil 25a becomes de-energized thereby permitting switch 25b to close and connect heater 29b between the power supply leads $LV_2$ and $LV_1$ through switches 17 and 28. In the event that the opening of switch S is for only a short period of time, heater 29b will not provide sufficient thermal energy to open its associated switch 29a, and contactor coil 23c will continue to be energized maintaining the switches 23a and 23b closed. Thus, if after a single short duration opening of safety switch S the motor 14 commences to function normally, the motor will continue to run in the normal manner and relay coil 25a will again become energized to open the switch 25b and thereby de-energize the heater 29b. During such subsequent opening of switch 25b, heat energy accumulated in the thermal relay 29 will dissipate. However, in the event that safety switch S again opens as a result of an abnormal current or temperature condition, the relay coil 25a will again become deenergized permitting the switch 25b to close and cause further accumulation of thermal energy in the relay 29. In the event that sufficient heat energy is provided by the heater 29b to open its associated switch 29a, the contactor coil 23c will become de-energized, thereby permitting switches 23a and 23b to open and thereby disconnecting the motor from the power supply leads $L_1$ and $L_2$. At the same time, the switch 29c associated with heater 29b will close thereby energizing the indicating light 30 to indicate to the user a malfunctioning of the apparatus.

The heater 29b will provide sufficient thermal energy for opening switch 29a as a result of the closing of the switch 25b for a total, or cumulative time which is variable dependent upon the amount of time the switch 25b is open between successive closings thereof and during which time thermal energy will be dissipated from the thermal relay 29. Illustratively, if the safety switch S remains open sufficiently long during the first opening thereof to maintain switch 25b closed and cause sufficient accumulation of heat energy in thermal relay 29, to open switch 29a, the opening of switch 29a will be effected with a minimum period of energization of heater 29b. A minimum period of between 30 and 90 seconds is preferred. If, however, switch S recloses before sufficient thermal energy is accumulated in thermal relay 29 to effect the opening of switch 29a, some of the thermal energy will be dissipated from thermal relay 29 during the time switch S is closed, as during this time the relay coil 25a will be energized and maintain switch 25b open, preventing energization of heater 29b. Thus, upon subsequent reopening of switch S, the switch 25b must be closed for an initial period of time to replace the thermal energy dissipated during the closed condition of switch S. Such cycling may occur over relatively long periods. However, under malfunction conditions, the cycling of switch S is usually rather rapid and only a small amount of dissipation of thermal energy from the relay 29 occurs during the successive closed conditions of the switch S. Thus, relay 29 effectively defines a summing accumulator operating as a function of the total time during which the switch S is open.

In control 16 when heater 29b provides sufficient energy to open switch 29a, the motor 14 will remain disconnected until the control is reset as by the opening of switch 28 or thermostat switch 17 to disconnect heater 29b, thus allowing heat to dissipate from the relay 29. When sufficient heat has dissipated, switch 29a recloses, placing the circuit for the motor in operating condition upon closing of switches 28 and 17. Normally, the control circuit would be reset by the manual opening of switch 28 since in order to open the thermostat switch, the thermostat would have to be reset at a higher setting.

Time delay heaters such as heater 29b conventionally have the above described inherent time delay in the reclosing of the associated normally closed switch. To permit a substantially immediate resetting of the control, a slightly modified control 116, as shown in FIGURE 3, may be provided wherein a holding relay 131 is provided having its coil 131a connected in series with a normally open contact 129a between thermostat 117 and power supply lead $LV_2$. A normally open switch 131b of relay 131 is connected in parallel with switch 129a and a signal light 130 is connected in parallel with the relay coil 131a. A normally closed switch 131c of relay 131 is connected between power supply lead $LV_2$ and contactor coil 123c.

The operation of control 116 is similar to the operation of the control 16 as discussed above, except that when the heater 129b provides sufficient thermal energy, it closes the normally open switch 129a to energize relay coil 131a which, in turn, opens the normally closed switch 131c to discontinue energization of the contactor coil 123c and thereby cause switches 123a and 123b to open. At the same time, the relay switch 131b closes to maintain coil 131a energized notwithstanding the opening of switch 129a. Thus, in control 116, the heater 129b of thermal relay 129 does not remain energized once the opening of switches 123a and 123b is effected. Resultingly, to reset the control 116, the user need merely open switch 128 or thermostat switch 117 momentarily (assuming that the momentary opening of the switch is effected sufficiently subsequent to the opening of switch 131c for heater 129b to have dissipated the previously accumuated thermal energy).

In FIGURE 4, a further modified control 216 generally similar to control 16 of FIGURE 2 is shown to include a timer 232 in lieu of the thermal relay 29 of control 16. More specifically, the timer 232 includes a timer motor 232a connected in series with the normally closed contact 225b of a relay 225. The timer motor drives a cam 232b having a lobe 232c. In the reset position as shown in FIGURE 4, the lobe 232c is arranged to open a normally closed switch 233 connected between terminal 220 of motor 14 and a normally open switch 234a of a relay 234, switch 234a being, in turn, connected to power supply lead $L_1$. Relay 234 further includes a coil 234b and a normally closed switch 234c connected through thermostat switch 217 to power supply lead $LV_1$. A second, normally closed, cam switch 235 is connected in series with switch 234c to contactor coil 223c, with relay coil 234b being connected in parallel across the series connection of switches 234c and 235. A signal light 230 may be connected in parallel with the relay coil 234b.

In operation, control 216 functions generally similar to control 16, except that whenever relay coil 225a is de-energized as by the opening of safety switch S in motor 14 while the contactor switches 223a and 223b are closed, the timer motor 232a is energized. The energization of the timer motor rotates cam 232b an amount corresponding to the length of time that the timer motor is energized. Thus, the lobe 232c moves in a clockwise direction from the position shown in FIGURE 4 until the total time of energization of the timer motor causes the lobe 232c to engage the switch 235. In its normally closed condition, switch 235 cooperates with switch 234c to short out the relay coil 234b and, thus, maintain full secondary voltage across the contactor coil 223c as long as thermostat switch 217 remains closed. When, however, cam lobe 232c opens switch 235, relay coil 234b becomes energized in series with contactor coil 223c. Relay coil 234b is a relatively high impedance coil as compared to the low impedance contactor coil 223c and, thus, the relay 234 is actuated to open switch 234c while permitting drop-out of contactor 223 and opening of switches 223a and 223b. At the same time, relay switch 234a closes to connect the timer motor 232a to power supply lead $L_1$ notwithstanding the opening of switch 223a and thereby cause the timer motor to continue driving the cam 232b back to the reset position wherein the lobe 232c reopens the switch 233 breaking the circuit to the timer motor from switch 234a and resetting the control.

Each of controls 116 and 216 is thus generally similar to control 16, except for the differences discussed above. Similar reference numerals are applied in connection with each of the controls except that in control 116 the reference numerals are one hundred higher than in control 16 and in control 216 the reference numerals are two hundred higher than in control 16. Each of controls 16, 116 and 216 provides a highly desirable improved control of the motor 14 in providing a time delay drop-out of the motor starting contactor which is a function of the amount of time that the internal inherent safety switch provided with the compressor is opened during malfunction conditions. While the controls permit a number of short duration cycles of operation of the safety switch which would not damage the compressor structure, the controls positively disconnect the motor of the compressor from the power supply in the event of continued cycling of the safety switch or opening thereof for an extended period of time indicative of serious malfunctioning of the apparatus.

The controls 16, 116 and 216 are extremely simple and economical of construction while yet providing the highly desirable advantages discussed above. They may be used with motors such as compressor motors provided with internal safety switches without requiring modifications to the motor structures.

While I have shown and described certain embodiments of my invention, it is to be understood that it is capable of many modifications. Changes, therefore, in the construction and arrangement may be made without departing from the spirit and scope of the invention as defined in the appended claims.

The embodiments of the invention in which an exclusive property or privilege is claimed are defined as follows.

1. Circuit means for controlling the operation of a hermetically sealed motor compressor having an internal safety switch for opening the circuit to the motor upon the occurrence of an abnormal operating condition of said compressor, said circuit means comprising:

first switch means closable for delivering operating electrical current to said motor and precluding delivery of said current to said motor when open;

electrically operable means for closing said first switch means; and energizing means for electrically energizing said electrically operable means to close said first switch means, said energizing means comprising control means including accumulating means accumulating an operating medium as a result of said safety switch being open while said first switch means is closed, and de-energizing said electrically operable means to open said first switch means when a preselected quantity of said operating medium is accumulated in said accumulating means.

2. The circuit means of claim 1 wherein said accumulating means comprises means for accumulating thermal energy as a result of electrical energization thereof and including second switch means responsive to thermal energy arranged to open upon reaching a preselected temperature.

3. The circuit means of claim 2 wherein said second switch means is arranged to open when said safety switch is open and said first switch means is concurrently closed continuously for a period of time in the order of approximately 30 to 90 seconds.

4. The circuit means of claim 1 wherein said accumulating means is arranged to dissipate accumulated operating medium when said safety switch and switch means are concurrently closed.

5. The circuit means of claim 1 further including means operable substantially concurrently with the opening of said first switch means for preventing further accumulating of said operating medium by said accumulating means to thereby commence dissipation of accumulated operating medium from said accumulating means after said preselected quantity of operating medium is accumulated in said accumulating means.

6. The circuit means of claim 5 further including manually operable switch means for re-energizing said electrically operable means after said dissipation of accumulated operating medium.

7. Circuit means for controlling the operation of a hermetically sealed motor compressor having an internal safety switch for opening the circuit to the motor upon the occurrence of an abnormal operating condition of said compressor, said circuit means comprising: first switch means closable for delivering operating electrical current to said motor and precluding delivery of said current to said motor when open; electrically operable means for closing said first switch means; energizing means for electrically energizing said electrically operable means to close said first switch means, said energizing means comprising control means including accumulating means for accumulating an operating medium when said safety switch is open and said first switch means is closed, and for de-energizing said electrically operable means to open said first switch means when a preselected quantity of said operating medium is accumulated in said accumulating means; and means operable substantially concurrently with the opening of said first switch means for preventing further accumulating of said operating medium by said accumulating means to thereby commence dissipation of accumulated operating medium from said accumulating means after said preselected quantity of operating medium is accumulated in said accumulating means, said accumulating means comprising means for accumulating thermal energy as a result of electrical energization thereof and including second switch means arranged to open when the accumulating means reaches a preselected temperature, said means for preventing further accumulating comprising relay means having third switch means controlling the energization of said electrically operable means and coil means energized as a result of said preselected quantity of operating medium being accumulated in said accumulating means to cause said third switch means to discontinue closing of said first switch means by said electrically operable means.

8. The circuit means of claim 1 wherein the accumulating means comprises a timer motor and means actuated by said timer motor.

9. The circuit means of claim 8 wherein said last-named means comprises a cam driven by said timer motor and switch means operated by said cam to de-energize said electrically operable means as the result of a preselected total movement of said timer motor.

10. The circuit means of claim 8 further including means for resetting the timer motor to a preselected start position subsequent to de-energization of said electrically operable means.

11. The circuit means of claim 1 wherein the motor compressor comprises a portion of a refrigeration apparatus including a thermostat having switch means for controlling the energization of said electrically operable means.

12. The circuit means of claim 1 including manually operable switch means movable between first and second positions, said manually operable switch means being effective when in said first position to cause said accumulating means to dissipate accumulated operating medium and being effective in said second position after dissipation of said accumulated operating medium to cause said energizing means to energize said electrically operable means.

References Cited

UNITED STATES PATENTS

| 2,516,538 | 7/1950  | Armstrong | 317—13   |
| 3,065,381 | 11/1962 | Kyle      | 317—41 X |
| 3,198,987 | 8/1965  | Brown     | 317—13   |
| 3,247,438 | 4/1966  | Kyle      | 318—472  |

JOHN F. COUCH, *Primary Examiner.*

R. V. LUPO, *Assistant Examiner.*

U.S. Cl. X.R.

317—13; 318—473, 221